US007329180B2

(12) United States Patent
Strom

(10) Patent No.: US 7,329,180 B2
(45) Date of Patent: Feb. 12, 2008

(54) GAMING SYSTEM WITH MULTIPLE GENERIC AND SUBGENERIC CHARACTERISTICS

(75) Inventor: Mark Anthony Strom, Auckland (NZ)

(73) Assignee: NativeGames Entertainment International Ltd, Auckland (NZ)

( * ) Notice: Subject to any disclaimer, the term of this patent is extended or adjusted under 35 U.S.C. 154(b) by 708 days.

(21) Appl. No.: 10/643,002

(22) Filed: Aug. 18, 2003

(65) Prior Publication Data

US 2005/0043080 A1 Feb. 24, 2005

(51) Int. Cl.
*G06F 17/00* (2006.01)
*G06F 19/00* (2006.01)

(52) U.S. Cl. ............................ 463/20; 463/12; 463/13; 463/16; 463/17; 463/18; 463/19; 463/25; 463/29

(58) Field of Classification Search ................... 463/20
See application file for complete search history.

(56) References Cited

U.S. PATENT DOCUMENTS 5,395,111 A * 3/1995 Inoue ..................... 273/143 R
6,068,552 A * 5/2000 Walker et al. ................ 463/21
6,227,969 B1 * 5/2001 Yoseloff ....................... 463/13
6,261,178 B1 7/2001 Bennett ........................ 463/20
6,386,973 B1 * 5/2002 Yoseloff ....................... 463/13
6,471,587 B1 10/2002 Wood et al. .................. 463/13
6,517,432 B1 2/2003 Jaffe ........................... 463/16
6,589,114 B2 * 7/2003 Rose ........................... 463/20

FOREIGN PATENT DOCUMENTS

GB 2169736 A * 7/1986

* cited by examiner

*Primary Examiner*—Robert Pezzuto
*Assistant Examiner*—Milap Shah
(74) *Attorney, Agent, or Firm*—Mark A. Litman & Associates, PA

(57) ABSTRACT

A reel-type display wagering game is provided in which the symbols on the frames or positions of the pay line display are capable of having an ordered arrangement of separately provided and separately determined generic symbols and species symbols. The generic symbols may be provided in a number of ways. The generic symbols may be provided in a separate set of reels or frames, or may be added as subtext or supertext on the same frame or reel position as the species symbols.

15 Claims, 10 Drawing Sheets

'THE SHUFFLE'
(120 HANDS)

HR = 1 in 2.4

| | | | | |
|---|---|---|---|---|
| A-K-Q-J-10 | K-A-Q-J-10 | Q-A-K-J-10 | J-A-K-Q-10 | 10-A-K-Q-J |
| A-K-Q-10-J | K-A-Q-10-J | Q-A-K-10-J | J-A-K-10-Q | 10-A-K-J-Q |
| A-K-J-Q-10 | K-A-J-Q-10 | Q-A-J-K-10 | J-A-Q-K-10 | 10-A-Q-K-J |
| A-K-J-10-Q | K-A-J-10-Q | Q-A-J-10-K | J-A-Q-10-K | 10-A-Q-J-K |
| A-K-10-Q-J | K-A-10-Q-J | Q-A-10-K-J | J-A-10-K-Q | 10-A-J-K-Q |
| A-K-10-J-Q | K-A-10-J-Q | Q-A-10-J-K | J-A-10-Q-K | 10-A-J-Q-K |
| A-Q-K-J-10 | K-Q-A-J-10 | Q-K-A-J-10 | J-K-A-Q-10 | 10-K-A-Q-J |
| A-Q-K-10-J | K-Q-A-10-J | Q-K-A-10-J | J-K-A-10-Q | 10-K-A-J-Q |
| A-Q-J-K-10 | K-Q-J-A-10 | Q-K-J-A-10 | J-K-Q-A-10 | 10-K-Q-A-J |
| A-Q-J-10-K | K-Q-J-10-A | Q-K-J-10-A | J-K-Q-10-A | 10-K-Q-J-A |
| A-Q-10-K-J | K-Q-10-A-J | Q-K-10-A-J | J-K-10-A-Q | 10-K-J-A-Q |
| A-Q-10-J-K | K-Q-10-J-A | Q-K-10-J-A | J-K-10-Q-A | 10-K-J-Q-A |
| A-J-K-Q-10 | K-J-A-Q-10 | Q-J-A-K-10 | J-Q-A-K-10 | 10-Q-A-K-J |
| A-J-K-10-Q | K-J-A-10-Q | Q-J-A-10-K | J-Q-A-10-K | 10-Q-A-J-K |
| A-J-Q-K-10 | K-J-Q-A-10 | Q-J-K-A-10 | J-Q-K-A-10 | 10-Q-K-A-J |
| A-J-Q-10-K | K-J-Q-10-A | Q-J-K-10-A | J-Q-K-10-A | 10-Q-K-J-A |
| A-J-10-K-Q | K-J-10-A-Q | Q-J-10-A-K | J-Q-10-A-K | 10-Q-J-A-K |
| A-J-10-Q-K | K-J-10-Q-A | Q-J-10-K-A | J-Q-10-K-A | 10-Q-J-K-A |
| A-10-K-Q-J | K-10-A-Q-J | Q-10-A-K-J | J-10-A-K-Q | 10-J-A-K-Q |
| A-10-K-J-Q | K-10-A-J-Q | Q-10-A-J-K | J-10-A-Q-K | 10-J-A-Q-K |
| A-10-Q-K-J | K-10-Q-A-J | Q-10-K-A-J | J-10-K-A-Q | 10-J-K-A-Q |
| A-10-Q-J-K | K-10-Q-J-A | Q-10-K-J-A | J-10-K-Q-A | 10-J-K-Q-A |
| A-10-J-K-Q | K-10-J-A-Q | Q-10-J-A-K | J-10-Q-A-K | 10-J-Q-A-K |
| A-10-J-Q-K | K-10-J-Q-A | Q-10-J-K-A | J-10-Q-K-A | 10-J-Q-K-A |
| ACE | KING | QUEEN | JACK | 10 |

FIG. 2

FIGURE 2A

| | | | | |
|---|---|---|---|---|
| ACE ♠ | KING ♠ | QUEEN ♠ | JACK ♠ | TEN ♠ |

FIGURE 2B

| | | | | |
|---|---|---|---|---|
| TEN ♠ | JACK ♠ | QUEEN ♠ | KING ♠ | ACE ♠ |

FIGURE 2C

| | | | | |
|---|---|---|---|---|
| ACE ♠ | KING ♣ | JACK ♥ | JACK ♦ | QUEEN ♦ |

FIGURE 2D

| | | | | |
|---|---|---|---|---|
| KING♥ | ACE ♥ | JACK ♠ | JACK ♦ | QUEEN ♣ |

FIGURE 2E

| | | | | |
|---|---|---|---|---|
| JACK ♦ | KING ♦ | ACE ♦ | JACK ♦ | QUEEN ♦ |

ROYAL SPOIL

PAYTABLE

| HANDS | ♠ | ♣ | ♦ | ♥ |
|---|---|---|---|---|
| A·K·Q·J·10 | 200 | 400 | 600 | 1000 |
| 10·J·Q·K·A | 100 | 200 | 300 | 500 |
| A·K·Q | 50 | 100 | 150 | 250 |
| A·K Q·J | 20 | 40 | 60 | 100 |
| A K·Q | 8 | 16 | 24 | 40 |
| A·K | 4 | 8 | 12 | 20 |
| K·A | 2 | 4 | 6 | 10 |
| ACE | 1 | 2 | 3 | 5 |

| | | | | | PERCENT PAY BACK | HIT FREQ | TOTAL HITS | TOTAL PAYS |
|---|---|---|---|---|---|---|---|---|
| REEL 1 FLUSH | 6 | 12 | 18 | 30 | 92.86% | 22.68% | 2,721,030 | 11,143,440 |
| REEL 2 FLUSH | 3 | 6 | 9 | 15 | 91.90% | 22.99% | 2,758,230 | 11,028,240 |
| REEL 3 FLUSH | 6 | 12 | 18 | 30 | 105.61% | 26.66% | 3,198,630 | 12,672,720 |

TAKE 97.25%

The Pay Table represents a SINGLE credit bet.

By DOUBLING or TRIPLING the bet, you DOUBLE or TREBLE the Pay Table amount shown.

FIG. 3

Fig. 6

REELS Reel 1 Reel 2 Reel 3 Reel 4 Reel 5

| Five Reel | Ace | King | Queen | Jack | 10 | TOTAL | REDS |
|---|---|---|---|---|---|---|---|
| ♥ | 1 | 2 | 1 | 2 | 2 | 8 | 664 |
| ♦ | 2 | 2 | 2 | 3 | 2 | 48 | BLACKS |
| ♣ | 3 | 3 | 3 | 2 | 3 | 162 | 8,226 |
| ♠ | 4 | 3 | 4 | 3 | 3 | 432 | |
| TOTAL | 10 | 10 | 10 | 10 | 10 | 650 | |

| Four Reel | Ace | King | Queen | Jack | 10 | TOTAL | REDS |
|---|---|---|---|---|---|---|---|
| ♥ | 1 | 2 | 1 | 2 | 2 | 32 | 856 |
| ♦ | 2 | 2 | 2 | 3 | 2 | 192 | BLACKS |
| ♣ | 3 | 3 | 3 | 2 | 3 | 378 | 4,494 |
| ♠ | 4 | 3 | 4 | 3 | 3 | 1,008 | |
| TOTAL | 10 | 10 | 10 | 10 | 10 | 1,610 | |

| Three Reel | Ace | King | Queen | Jack | 10 | TOTAL | REDS |
|---|---|---|---|---|---|---|---|
| ♥ | 1 | 2 | 1 | 2 | 2 | 160 | 1,080 |
| ♦ | 2 | 2 | 2 | 3 | 2 | 560 | BLACKS |
| ♣ | 3 | 3 | 3 | 2 | 3 | 2,160 | 9,180 |
| ♠ | 4 | 3 | 4 | 3 | 3 | 3,360 | |
| TOTAL | 10 | 10 | 10 | 10 | 10 | 6,240 | |

| Two Reel | Ace | King | Queen | Jack | 10 | TOTAL | REDS |
|---|---|---|---|---|---|---|---|
| ♥ | 1 | 2 | 1 | 2 | 2 | 1,800 | 0 |
| ♦ | 2 | 2 | 2 | 3 | 2 | 3,200 | BLACKS |
| ♣ | 3 | 3 | 3 | 2 | 3 | 6,300 | 0 |
| ♠ | 4 | 3 | 4 | 3 | 3 | 7,200 | |
| TOTAL | 10 | 10 | 10 | 10 | 10 | 18,500 | |

| One Reel | Ace | King | Queen | Jack | 10 | TOTAL | REDS |
|---|---|---|---|---|---|---|---|
| ♥ | 1 | 2 | 1 | 2 | 2 | 7,133 | 0 |
| ♦ | 2 | 2 | 2 | 3 | 2 | 14,267 | BLACKS |
| ♣ | 3 | 3 | 3 | 2 | 3 | 11,614 | 0 |
| ♠ | 4 | 3 | 4 | 3 | 3 | 15,486 | |
| TOTAL | 10 | 10 | 10 | 10 | 10 | 48,500 | |

Reel Combinations 100,000 Safety Check 100,000

GAMING SYSTEM WITH MULTIPLE GENERIC AND SUBGENERIC CHARACTERISTICS

BACKGROUND OF THE INVENTION

1. Field of the Invention

The present invention relates to the field of gaming equipment, particularly reel-type gaming equipment in mechanical or video format, and video games that may use an ordered array of symbols to provide paylines.

2. Background of the Art

Slot-type games (both Mechanical slots with wheels or reels that rotate about an axis or Video slots that display virtual reels with symbols thereon) are important components of the entertainment provided by casinos and are equally important centers of profit for casinos. Various forms of slot-type games have been used commercially for over one hundred years. Earlier versions of slot-type games had panels that flipped over to display symbols or had concentric circles of symbols that, if aligned in an order in a specific position (along the payline), would allow the person placing a wager in the machine to collect an award.

The more traditional video slot machine paylines of symbols aligned horizontally on the machine were actually later developed, but have become the standard in the trade. Original paylines were usually provided with 3 or five different symbols being displayed on the payline. The traditional five frame symbols developed because many early slot-type displays were based on stud or draw poker hands where five cards were provided. The use of artificial symbols on paylines (bells, cherries, sevens, plums, lemons, oranges, bars, etc.) allowed designers more freedom in payline development and simplified machines by providing three frame displays on the paylines.

Poker-style card games have been played in gaming casinos for many years. Initially, gaming casinos provided segregated card rooms in which the poker players gathered around a poker table and played whatever game was being dealt at that table. The gaming establishment provided the dealers, handled the exchange of money for gaming chips and took a rake (a percentage of each poker pot) as the fee for these services. Alternatively, instead of raking from each pot, the gaming establishment would simply charge a time based fee for providing the poker game.

This type of live poker played in legalized gaming establishments such as those in Nevada is not widely accepted by the average gaming patron. Most are afraid to play due to the reputation that professionally skilled players are lurking in the poker room, waiting for the unsuspecting player to come along. The poker-style gaming equipment has enabled players to enjoy a level of excitement in poker games without fear of professionally competition.

With the advent of computer electronics, one player poker games played on electronic gaming machines have also become quite popular. Five card draw poker was the first poker game adapted to this format and the player attempts to achieve a high ranking poker hand from his initial five card dealt hand and any draw replacement cards he desires. A payout table is provided that pays the player various multiples of his wager depending on the rank of poker hand that the player achieves.

Since the introduction of electronic video draw poker, many other variations of poker have been adapted to electronic one player gaming machines. Joker's wild poker, deuces wild poker and five and seven card stud have all been programmed for play in this style—each with its own unique payout table reflecting the relative odds of achieving various poker hand rankings in each of these games.

Slot machines generate greater than fifteen billion dollars per year in revenue for U.S. casinos, with individual machines typically earning between fifty and one hundred and fifty dollars per day. One of the fastest growing segments of slot machine play is video poker, a game in which various elements of draw poker are represented on a video display. Players draw and hold cards in an effort to attain a hand high enough to qualify for a prize or payment. Starting with "Jacks or Better," video poker quickly expanded into "Deuces Wild" and "Joker Poker" as well as countless variations of the above with different payout schedules. Players are attracted to the relatively high payouts possible for top hands such as a royal flush, as well as the frequent lower-end payouts for hands as low as a pair of jacks. Of equal import is the fact that poker symbols are universally understood in most cultures and there is appreciation of the potential for both rank, suits and order in the display of the cards. This offers potential for games that have not been fully appreciated. For example, even though the order of cards may be used in valuing payouts in poker type games, is has been common in casino to limit the dependence on payouts to a specific order of cards in poker hands to unique bonuses (e.g., awarding a jackpot or grand prize such as a car) when a Royal Flush appears in left-to-right descending order (Ace-King-Queen-Jack-Ten in suit).

Additionally, many players find that the interactive nature of the game, choosing which cards to draw, provides a more exciting game than the traditional reel-based slot machine, in which the player simply passively watches the outcome. Although popular with players, video poker has a number of disadvantages from the casino's perspective. First, game speed can be significantly slower than conventional reel machines. Players sometimes agonize over a particular play, taking their time in deciding what the correct play is. With no incentive to accelerate play, players sometimes languish over their decisions. Casinos prefer a faster-paced game since profits rise in direct proportion to the number of hands completed per hour. Additionally, the house edge associated with video poker has consistently deteriorated as casinos have begun to compete more for players. Because full payout tables are provided on the face of the machine, players can easily distinguish between high payout machines and low payout machines. Competition for video poker players has resulted in some video poker machines which pay out in excess of 100% with perfect playing strategy. Although most players are not playing perfectly, the growing availability of books and computer software is resulting in more and more sophisticated players. The slow play and declining house advantage, when combined with the significant cost of player complimentaries (comps), such as free meals and drinks, has resulted in shrinking casino profits for video poker. Consequently, there is a need to increase the house advantage without appearing to disadvantage the player.

One problem facing game manufacturers is the need to continually create new and exciting games to maintain the interest of the public. This is more difficult than it appears at first glance. Of course, to be successful, the new game must appeal to the player to generate profitable revenue. The gross revenue generated by a game is based on a variety of factors, such the length of time each player plays, the amount wagered, and the average percentage "take" of the game. If the "take" is too high, a player is generally unwilling to play. If the "take" is very low, then it is necessary to ensure that the game is played nearly continuously so that revenue is constantly being derived. When players play a game for only short periods of time, the revenue of the game is generally reduced because of "idle" time between players. The amount wagered also contributes to the revenue. In general, if the amount that a player is willing to bet, either on each game or over time can be increased, then the revenue of the game will generally increase. These and a variety of other factors all contribute to the total revenue produced by a game.

The ability of a game to generate a profit is dependent not only upon the gross revenue produced by the game, but the cost of producing and operating the game device. A game may be very appealing, but if extremely expensive to produce, its revenue may not exceed its costs. Profitability is thus tied to both the cost of the game and the ability of the game to generate revenue.

The appeal of a game and the length of time a player will play a game are dependent upon a number of factors. These factors include some of those described above, such as the odds or take, and on a variety of other factors. For example, a game which is very difficult to understand and play will not tend to draw many long-term players. A few players may take to the game, while most will be alienated and play once or twice. A game which involves little skill may appeal to a wide cross-section of the public because of its ease of play. On the other hand, the length of time a player may play such a game may be fairly short, with the player losing interest unless "luck" is on their side and they see consistent winnings during a session of play.

U.S. Pat. No. 6,517,432 describes a gaming machine comprises a visual display and a game of chance shown on the display. In connection with the game of chance, the visual display shows an array of symbols in visual association with at least one pay line. The array includes a special symbol and a stop-game symbol. The game of chance includes a plurality of game rounds. During each of the game rounds the special symbol and the stop-game symbol randomly move to and stop at new respective positions on the array. The game of chance awards a payout during the round if the symbols along the pay line correspond to a winning game outcome. The game of chance ends in response to the new respective positions on the array during one of the game rounds being the same position. The array optionally includes a second special symbol that, during certain ones of the game rounds, also moves to and stops at a new position on the array. In determining whether to award a payout, the array positions containing the special symbols are preferably evaluated as wilds.

U.S. Pat. No. 6,471,587 describes a method of playing a video wagering game that includes selecting indicia such as representations of playing cards and presenting them as a first hand and a second hand to a player. Certain hand indicia combinations are designated as winning outcomes with the remainder designated as losing outcomes. Upon viewing the first and second hands the player opts to rearrange the hands by exchanging one or more indicia between the hands attempting to obtain at least one winning outcome or to better their outcome(s) for the hands. If one or both of the hands comprises winning outcome combinations of indicia, the player is rewarded. Otherwise, the player loses.

In a preferred embodiment the indicia are representations of playing cards. The player makes a wager and two, separate, five card hands are displayed. If one of the hands has a qualifying holding of cards, e.g. a pair of 7's or better, the player is given the option to exchange cards between the two hands to increase their expected reward. For example, where the reward is based upon the ranking of hands according to the rules of Poker, the player may opt to move cards to increase the Poker ranking of one or both of the hands to increase their reward. After the player has exercised their option, the final hands are compared to a schedule of winning outcome hands and, if either or both of the hands represent winning outcomes, the player is rewarded based upon the ranking of the hands.

U.S. Pat. No. 6,261,178 describes machines of the type having multiple pay lines available, in which the player would purchase the option of playing for a win on lines other than the centre line. In order to add further player interest, the game is also provided with a random feature whereby under certain circumstances, a further combination of symbol positions, referred to as the "mystery line", will be randomly selected by the machine's controller to give the player another winning opportunity. A prize is paid to the player in the event that a predetermined combination of symbols is displayed in the randomly selected arrangement of symbol locations, "mystery line."

SUMMARY OF THE INVENTION

A reel-type display wagering game is provided in which the symbols on the frames or positions of the pay line display are capable of having an ordered arrangement. A very convenient set of specific or species symbols are poker cards or playing cards, such as (in a five line display) the Ace, King, Queen, Jack and Ten value cards in the various suits being provided. Other symbols, especially generic symbols, such as days of the week (Saturday, Sunday, Monday, Tuesday, Wednesday, Thursday and Friday), Months of the year, numbers (e.g., 10,000; 1,000. 100, 10 and 1), the size of images (e.g., 20 mm, 16 mm, 12 mm, 8 mm and 4 mm) which would be readily distinguishable, colors of the rainbow (Red, Orange, Yellow, Green Blue, Indigo and Violet), distances or measurements (e.g., 1500 m, 800 m, 400 m, 200 m and 100 m), or any other symbols or values that have a recognizable or displayed order (e.g., value of cards, showing an order of Mazzerotti, Mercedes, Cadillac, Honda and Yugo) can be used. Additional symbol variations within the order should also be used, such as suits for cards, colors for other values, patterns (stripes, checks, plaids, patterns, etc.) are also desirable symbol modifiers. The generic symbols may be provided in a number of ways. The generic symbols may be provided in a separate set of reels or frames, or may be added as subtext or supertext on the same frame or reel position as the species symbols.

The apparatus displays the symbols along a payline (the position of the symbols being randomly generated by any of the systems or programs, algorithms or templates known in the art to control symbol display in a manner that enables payouts to be controlled or predetermined over time) and wards are provided for the display of symbols which includes at least a multiplicity of payouts that considers both order and symbol modifiers.

BRIEF DESCRIPTION OF THE FIGURES

FIGS. 2A, 2B, 2C, 2D and 2E show a first set payline in which symbols and symbol modifiers are displayed. In FIG. 2A, a Royal Flush with progression of rank from highest to lowest, left-to-right in spades is shown on the payline.

FIG. 2B shows a Royal Flush with progression of rank from highest to lowest, right-to-left in spades is shown on the payline.

FIG. 2C shows a set of symbols with an ACE of spades in the first square.

FIG. 2D shows a payline symbol display set wherein the first two frames are KING of hearts and ACE of hearts.

FIG. 2E shows a symbol display that has no ordered payout set on the payline.

FIG. 3 shows a paytable for the "Royal Spoil™" version of a game according to the practice of the present invention.

FIG. 6 shows a table compilation of all possible reel combinations.

DETAILED DESCRIPTION OF THE INVENTION

Figure 1:
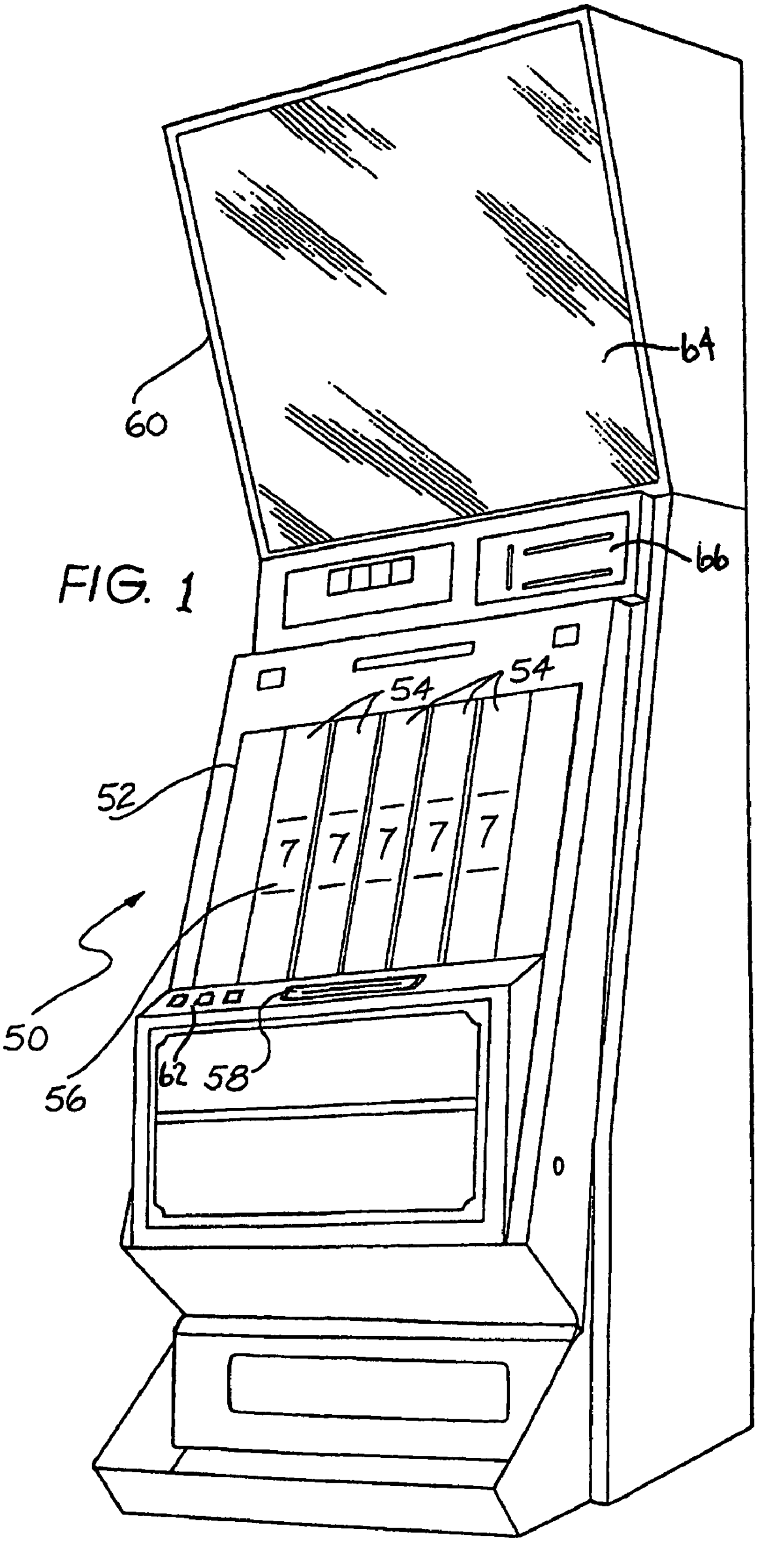
FIG. 1 shows a video gaming apparatus on which the games of the invention may be displayed.

The game of the present invention is most conveniently described with reference to the use of playing card symbols and on video gaming equipment, but the description, as noted above, applies to any symbols in which an order may be apparent or defined in the play of the game, and may also be played on mechanical reel machines also. The game may be played with 3, 4, 5 6 or more frames displayed on each payline, although the use of 5 or 6 frames per payline is preferred. Any format of symbol display controls such as random number generators, pure statistical mapping, template mapping (as in CA 2,357,130) or other reel mapping systems (e.g., U.S. Pat. No. 4,448,419). Processing controllers may be individually hardwired systems, PC-based, MAC-based, and may operate with any available operating system (e.g., WORD, LINUX, etc.) and with any system having sufficient functionality to support the implementation of the games of the invention. These games may be played at a casino, on-line, or as video games with score counts maintained.

The underlying play of the game is the provision of viewable (player viewable) paylines on a screen. The paylines may be horizontal, vertical, diagonal, non-linear, circular, or the like, but should be capable of being read in an order (e.g., the frames should be discernible as first frame, second frame, third frame, fourth frame, fifth frame, etc.) in a payline. The symbols within the frames are altered after a wager is placed in the machine. The alteration may be by spinning of reels, virtual spinning of virtual reels, spinning of individual frames, morphing of paylines or individual frames, flash replacement (complete image replacement) within paylines or frames, or any other method by which images within paylines and reels may be changed. As noted, the symbols should be recognizable and/or defined in the rules and play of the game as having an order, which is an organizational or ranked relations among all of the symbols. In mathematical terms, for ordered symbols, A>B>C>D>E defines symbol order such that an appearance of AB is an ordered array, but BD is not an ordered array because of the absence of C from the order between B and D. In the non-limiting example of poker hands, with a five or six reel game, the order would be Ace>King>Queen>Jack>Ten (optionally)>Nine. The symbols are displayed in the frames displayed on the screen (or by mechanical reels) and the distribution of symbols is evaluated to determine if the display provides winning arrangements of symbols. In addition to the rank of the order, symbol modifying effects are also desirable or required to provide an optimal game. With the use of poker/playing card symbols, suits are the most appropriate symbol modifiers. With other symbols, colorations, decoration, size, height, animation, values, or the like may be used to be the symbol modifiers. For example, where days of the week are used as the symbols, colors such as Red, Blue, Yellow and Green may be used to modify the symbol to provide subsets or arrangements. Similarly if cars, planes, trains, boats or other vehicles are used as the rank of the symbols, colors or years (1920, 1940, 1960, 1980 and 2000) may be used to modify the underlying symbols. As noted earlier, the poker symbols and suits shall be used in the detailed descriptions, but the practice of the invention is not to be interpreted as limited thereto.

FIG. 1 shows a general gaming cabinet 50 with such standard components as the game display panel 52 having five columns 54 and a major payline row 56. A currency slot 58 and card slots 66 (for credit cards, player cards, printed slip insertion/emission) provided. Player control buttons 62 are shown although the display panel 52 may also have touch screen functionality. The gaming cabinet 50 usually has a fixed, inactive, or active non-game display panel 64 on which advertising, game rules, payout tables, animated awards or service notices etc. may be provided.

FIGS. 2A, 2B, 2C, 2D and 2E show a first set payline (100) of frames 102, 104, 106, 108 and 110 in which symbols and symbol modifiers are displayed. In FIG. 2A, a Royal Flush with progression of rank from highest to lowest, left-to-right in spades is shown on the payline. This order of suit and rank would have a distinct payout rate shown on a paytable. In FIG. 2B, a Royal Flush with progression of rank from highest to lowest, right-to-left in spades is shown on the payline. This order of suit and rank would have a distinct payout rate shown on a paytable.

FIG. 2C shows a set of symbols with an ACE of spades in the first square. This may be a symbol that is provided with an award in a paytable, but the other symbols (including the pair of Jacks) may or may not contribute to the award. An objective of the symbol display game is to provide an order to the symbols and possibly a suborder (symbol modifier) in conjunction with the symbols. Although awards may be provided for non-ordered displays (e.g., four-of-a-kind in frames 104, 106, 108 and 110), an underlying element of the game is the award of the ordered display of symbols and possibly symbol modifiers.

FIG. 2D shows a payline symbol display set wherein the first two frames are KING of hearts and ACE of hearts. This order (from left-to-right) is ascending rather then descending, but is provided in the pay table as a payout arrangement of ordered symbols, as is the ascending Royal Flush of FIG. 2A. The order, however, does have to begin with the first left hand frame in the preferred practice of the invention. With additional wagers and the election of additional paylines, order from other positions (e.g., right-to-left, diagonal, non-linear, etc.) may also be provided in the play of the game.

FIG. 2E shows a symbol display that has no ordered payout set on the payline. This flush may be paid on occurrence of the flush on any single payline wager.

FIG. 3 shows a possible paytable for play of one embodiment of the symbol order/sub symbol order game of the present invention. These payout rates are illustrative and may be varied for many reasons, such as higher player payouts, higher house retention, promotional events, changes in game rules, addition of bonus events, addition of jackpots or super jackpots, addition of progressive events, addition of further paid events, and the like.

A method of playing a game according to the present invention would include, for example, a player placing a wager on a gaming apparatus, the apparatus displaying paylines with symbols thereon after placing of the wager, the apparatus determining winning events in the paylines based at least in part on:

- the appearance of at least a set of symbols in a specific order, where there are at least two different sets of specific orders in which symbols must appear for there to be an award; and optionally,
- the set of symbols may consist of a set of symbols that is equal to the total number of frames in a payline (e.g., five frames and only A-K-Q-J-10's are available).

This description differentiates from conventional poker-type games in which the order of a Royal Flush may provide an increased bonus in the game, as that is only a single set of symbols in a specific order wherein the symbols and the order provide a different payout. The sub-symbols in the ordered Royal Flush have no effect, and the Royal Flush is defined itself as the single set of symbols. This contrasts significantly from the underlying order of play in the present game where not only is A-K-Q-J-10 in suit and order a payout set of symbols, but also other specifically ordered sets of symbols such as 10-J-Q-K-A (in suit or possibly out of suit as a straight set of symbols rather then Royal Flush), A-K-Q-J in suit, A-K-Q in suit, A-K in suit, any ACE with any K-Q or any like-suited (between the K and Q) King and Queen, and K-A in suit are other available payline arrangements of symbols. It is also possible to have the order be on an internal set of the frames (e.g., given five frames numbered left-to-right as frames 1, 2, 3, 4 and 5, the order may be allowed to appear in frames 2, 3 and 4 for example. This type of internal order is usually avoided solely for aesthetic purposes in the reading of winning paylines, except where scatter pays are used.

It is possible to incorporate elements of other known gaming plays and systems into the practice of the present invention. For example, multiline games and draw multiline games are possible and can be accommodated to the practice of the present invention. For example, with 2, 3, 4, 5 10, 15, 20, 25 etc. separate or arrayed rows or paylines available, a first payline may be presented after the initial wager, and the player elects to hold or discard various symbols. On each other payline or row on which a player has placed a wager, the retained (or not discarded) symbols will remain, and upon activation, all of the other symbols will be filled independently on each payline or row. In this way, multiple related plays of the same game will be provided.

The occurrence of certain ranked hands or predetermined event may trigger bonus events (for adding fixed amounts, multiplying wagers, multiplying winnings or otherwise enhancing the award or a payout to a player. The predetermined event could even be a non-award paying collection of symbols, such as four-of-a-kind in the same suit, five-of-a-kind in one or more suits, and the like. The bonus event may be free spins (at a fixed wager amount, such as the last wagered amount or the maximum or minimum wager amount) or may be a game event completely unrelated to the play of the underlying game. Those of ordinary skill in the art are aware of the many available bonus events such as wheel games (e.g., Bally's Monte Carlo game; IGT's Wheel of Fortune), pachinko-type bonus displays, pick until you match bonuses, picking hidden awards until and end-bonus feature is selected, picking hidden bonus amounts until the number of awarded picks has expired, games that select multipliers for wins or wagers, and the like.

The game may be played in a number of different formats, some of which have already been described an alluded to in the above descriptions. One method of play of the present invention would comprise two distinct sets of image or symbol providing display areas, such as reels, frames or panels, for example, provided as two sets of aligned five (5) frame paylines. The frames or panels may be provided by physical wheels or reels or by virtual reels or wheels on a video screen. The frames and paylines are referred to as aligned because the displays on a first one set of frames (e.g., the higher line of five reels) may be used for one set of symbol displays (e.g., the generic symbol displays, such as the playing card suits), and the lower set of frames has each frame of the second set correspond with an association (e.g., directly physically under or directly physically above) to each respective frame in the first one set of frames and displays the species symbol (e.g., the playing card rank, here preferably limited to Ace, King, Queen, Jack and Ten, and optionally Nine or lower or a Wild card).

The symbols may be displayed in the frames in many different formats. A preferred format is for one of the lines to be completely displayed (e.g., the topmost line of frames, e.g., the generic symbols or the species symbols) to be displayed first and then the other line of symbols (e.g., the lowermost set of frames with the species symbols) to be displayed. By providing the complete display of one line of symbols, the potential award of a large payout can be anticipated by a player. For example, if the display on the first line of frames is ♠♠♠♠♠, the player will anxiously await the display of symbols, knowing that at least a flush has been achieved, and possibly the Royal Spoil™ straight flush in descending order may be shown. Similarly, if the species symbols were shown first, a combination of A, K, Q, J, 10 will be eagerly anticipated for display of the generic symbols of spades, hearts, diamonds and clubs.

The generic symbols and the species symbols may be initially displayed within their own frames and frame lines one at a time, in sequence or randomly within the lines or may be displayed at the same time, within lines or among the two lines. It is preferred that one line at a time be displayed (e.g., the generic line, of spades, hearts, diamonds and clubs) and that one frame at a time be displayed, typically from left to right or right to left along the line. The sequence of displays enhances player anticipation and enjoyment.

Figure 4:
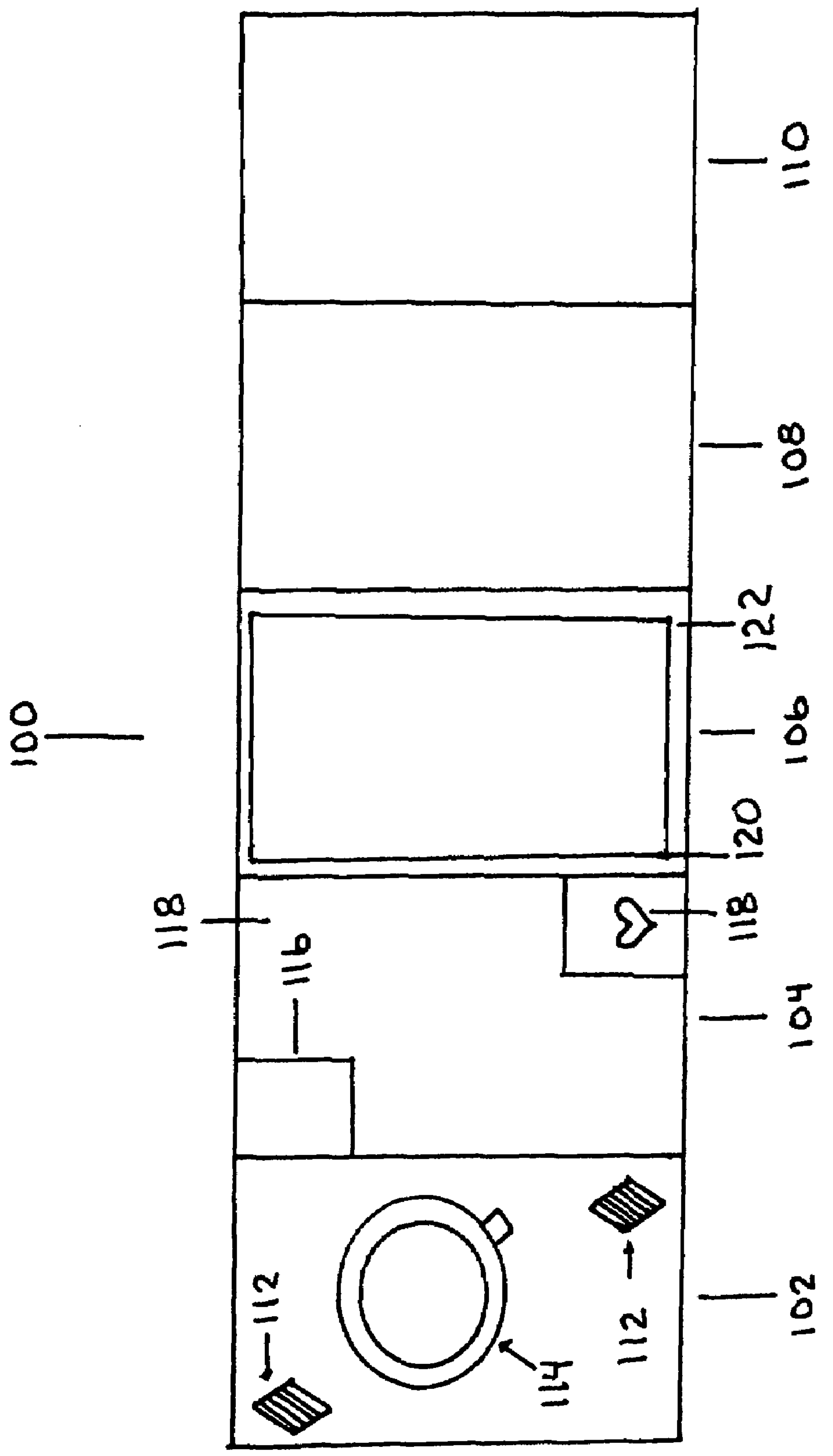
FIG. 4 shows a displayed reel frame with a generic symbol subtext and a species symbol text.

Rather then having two distinct sets of five frame lines, it is also possible to provide a single payline, which may have large graphics thereon because of the space allowed by having only a single line rather then two lines. The single line of frames 100, as shown in FIG. 4, has five individual frames 102, 104, 106, 108 and 110 for display of distinct symbols. A set of symbols is shown in only frame 102 for purposes of illustration in FIG. 4. Frame 102 is shown with the generic symbols 112 (diamonds) and the species symbol 114 (Queen). The generic symbols 112 may be easily provided in a video display module by provision of the randomly selected symbol in the appropriate location within the frame 102. Similarly, the species symbol 114 will be displayed, upon random selection, in the appropriate location within the frame 102. In a mechanical reel display, either the region 116 (as shown in frame 104) is transparent or is a hole in the mechanical reel 118, or the entire mechanical reels surface can be transparent with opaque indicia (e.g., 118) printed or painted onto the reel 118 in the appropriate areas. The transparent reel surface will allow an independent reel e.g., 120 in frame 106) to turn underneath a top reel 122 and thereby display the generic symbol(s) and the specie symbol(s) within a single frame.

Figure 5:
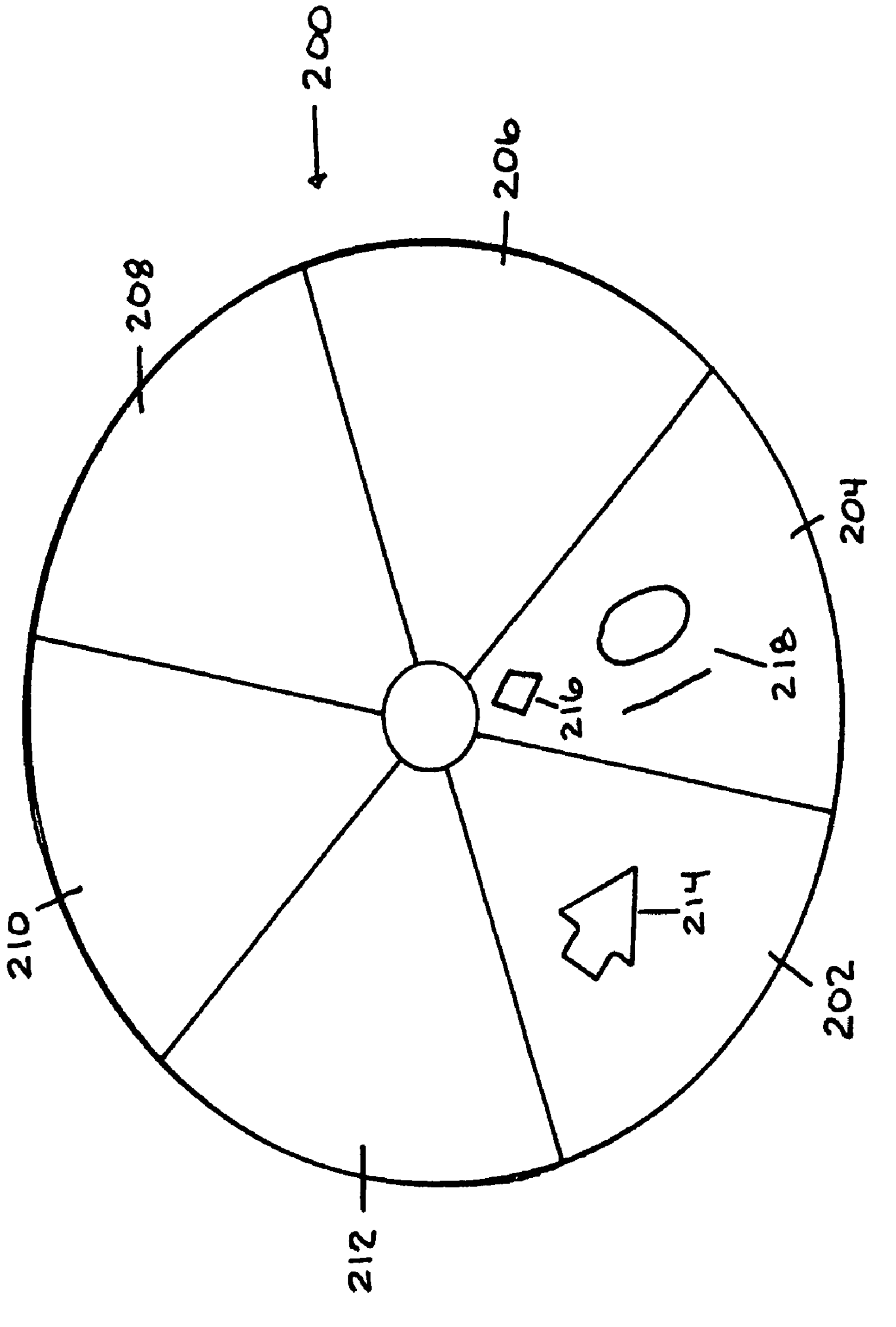
FIG. 5 shows an alternative wheel-type reel display.

It is also possible to have displays with other then row and column orientation of the symbols. For example, in FIG. 5 is shown a Wheel display format 20 for the game of the invention. Shown on the wheel format 200 are six frames 202, 204, 206, 208, 210, and 212. Five frames may be shown, but where a five symbol alignment is desired and order is important, the sixth or first frame 202 provides an orientation symbol 214 that shows the beginning of the order, starting in frame 204. Again, the symbols 216 and 218 may be shown on separate (e.g., concentric) spinning circles or may be shown in virtual display on a display surface such as CRT, LED, LCD, plasma screen or the like. The symbols (both generic and species) may be shown in the various orders provided (one at a time, all at once, sequentially clockwise or counterclockwise, randomly, etc.) as with the column and row frame design described above.

The following information explains in some further detail objectives and payout considerations in a preferred practice of the invention where there are two five frame rows associated with each other. To win a top award the 5 top reels in “Royal Spoil™” must first be flushed in one of the suit symbols (e.g., H.H.H.H.H.). The next step is to provide the species symbols (e.g., the rank). To win the highest possible payout, the Ace symbol must be located on the bottom set of frame directly below the left-most Heart (or right-most Heart) symbol, followed by King, Queen, Jack and Ten The five frames in each line (the upper generic symbol line, now discussed as having the H, H, H, H, H orientation) and the lower species symbol line. For purposes of discussion, it will be assumed that the new frames on the species symbol line have being rearranged in the 5 positions, which occurs after each event, where selecting the Ace followed by the K.Q.J.10 in that order, to collect the top award. In the event of 5 flushed reels (the five hearts or five spades, etc. in the generic reels) the player has already received the Reel-flush 1 award. If unable to locate the ace on their first selection they will be reduced to playing for a lesser reward (e.g., $1^{st}$ selection King, $2^{nd}$ selection Ace). If this occurs, the player has achieved K, A on the pay table, and their theoretic options at this stage of the process are, select the Queen (K.A.Q) and move up the pay table, and then possibly select (be randomly assigned) the Jack (K, A, Q, J) to get an even higher award. If the Jack appeared on the third selection after K.A, then the player must select the Queen (K.A.J.Q) next, in order to claim the higher award or be reduced to the K.A prize. The selection of the 10 will spoil (“SPOILER”) the potential limits of advancement and the alternative number of ways to advance up the pay table and if the 10 was selected first, the player will have to then select a J.Q.K.A. in that order to collect an award. The selection of any symbol cannot spoil the potential for some award on the first species pick when the reels are flushed.

In the event of flushing only the first 4 reels from left to right or right to left (e.g., H.H.H.H.C. or C.H.H.H.H.), the player must select A.K.Q.J. in that order to collect the highest possible award, followed by an A.K.Q. in any order and so on down the pay table. Note: the player has received the Reel-Flush 2 award already. In the event of flushing only the first 3 reels from left to right or right to left (e.g., H.H.H.C.S. or S.C.H.H.H.), the best award potentially offered here is the selection of A.K.Q. in that order followed by A.K.Q.(e.g., K.A.Q.) in any order and so on. Also note that the player will receive the Reel-Flush 3 award only if the generic suit symbol on the last reel (to the right when playing from the left ), or the first reel (to the left when playing from the right), is a red one(H or D). Flushing the first 2 reels from left to right or right to left (e.g., H.H.C.S.D. or D.S.C.H.H. ) reduces the player to playing for the bottom 3 awards on the pay table by first selecting the A.K. in that order or, reversed order K.A., or selecting the Ace first only(e.g., A.Q.). A non flush results in one selection only which must be the Ace to collect an award. Another speed factor in “Royal Spoil™” is the ‘Spoiler’, which terminates play immediately and pays any entitlement at that point. ‘Spoiler’ means selecting a ranked species symbol that stops the advancement up the pay table, or ends the game without reward, e.g., The generic symbols H.H.H.H.H. appear and the player can attempt the top award as they are entitled to 5 selections. The first selection is the ‘ACE’ (‘A.’ receives an award), secondly the ‘KING’ (‘A.K.’ increases the award), thirdly the ‘JACK’ (A.K.J. ‘spoiled’ the chances of collecting the top award A.K.Q.J.10).The player now has 2 selections left (Q and a 10). Select the ‘QUEEN’ (A.K.J.Q) next and increase the award (A.K.Q.J in any order), or select the 10 (A.K.J.10) and ‘SPOIL’ any further advancement up the paytable and pay out on A.K. Another example is when the generic symbols read H.D.C.S.D (a non-flush reel), the player is entitled to 1 selection only, which must be an ‘ACE’ to collect the award. The selection of either a King, Queen, Jack or Ten first would result in the attempt to locate the ‘Ace’ as that of being termed ‘SPOILED’. The term ‘SPOILER’ relates to the characterization of the game-over content employed in the game ‘Royal Spoil’ and other variations, designed to tempt and congratulate play. Another function is indicators (see screen design), which help the player by flashing and highlighting the ranked symbols required to collect an award, eliminating each flash as the symbols are selected and indicating to the player to continue play. This will help to keep the game moving also.

The 5 Reels on the top are preferably the suit symbols only, which indicate to the player what suit they’re playing in and how many reels from left to right or right to left are flushed (coupled with flashing indicators above the reels), if any. The A, K,Q, J, 10, ranked species symbols appear on the bottom or shuffled component, and depending upon what the reels reveal by way of suit or consecutive suit symbols, reveals how many possible selections and awards a player is entitled to play for. These 5 positions are rearranged after every event and there is 120 ways in which they could be positioned (see The Shuffle in FIGS. 3 and 6).

It is also possible to use blank spaces in the frame displays, but that is not necessary to practice of the invention. A wild card or Joker may be added as a wild card variation “Wild Royal Spoil™” and as a special symbol in the variation “Joker Spoiler™”. These 2 games would require the bottom or shuffled component of the device to provide 6 potential positions as the joker will be added to the ranked species symbols and the suit rank would be immaterial to a Joker display. The paytables would be adjusted for use of a game with a Joker present.

A.K.Q.J.10.Jkr. (or alternatively in a five frame game A, K, Jkr, J, 10), these 6 positions are rearranged after every event and there are now 720 ways in which hands can be formed. The 5 reels and suit symbols on the top remain the same.

The reel flush awards are clearly shown in FIG. 6, whereby an award is guaranteed after a spin of the generic symbol line, and the guaranteed award can only be increased or remain the same in the spin of the second line of species symbols. That table also shows the Reel-Flush 2 (4 consecutive suit symbols from L-R or R-L) and the Reel-Flush 3 (3 consecutive suit symbols from L-R or R-L) awards on the pay table of FIG. 6. The Percent Pay Back or Return to Player (RTP) configurations where the $1^{st}$ returns 94.34%, the $2^{nd}$ 94.3% and the $3^{rd}$ 103.21%. The $1^{st}$ and $2^{nd}$ RTP's are always on offer but the $3^{rd}$ one comes into play when a red suit symbol(H or D) appears on the $5^{th}$ and last reel to the left or right, depending on which way the reels are being read, which is in this scenario, 40% of the time.

The overall average house % (Take) is 97.36%. Note: The pay tables can be easily manipulated to reflect bigger or smaller returns to the house. The paytables of FIGS. 3 and 6 are demonstrations to reveal the method of ratios used in 'RS' to balance the negative expectations against the positive expectations. The Reel-Flush awards are the payouts awarded on the first predetermined ordered set (Reels). The incentive to increase a wager is in the fact that awards are doubled and tripled, but, a max coin bonus or any other type of jackpot system can be added.

The structure of the reels is concealed, as in any reel device is, giving the house the advantage but the shuffled or rearranged component is revealed by the fact that there is only 5 symbols (A.K.Q.J.10) under the 5 available positions giving the advantage to the player. 'ROYAL SPOIL' is a game designed around the combination of a reel-type device coupled with the shuffle-type device (reel-shuffle) where the outcome is 60% negative expectation and 40% positive expectation. This method provides a mechanism that creates the necessary house advantage, while providing the player a 40% positive playing field, allowing for the potential to create strategies which consequently involve increasing wagering.

Figure 7A:
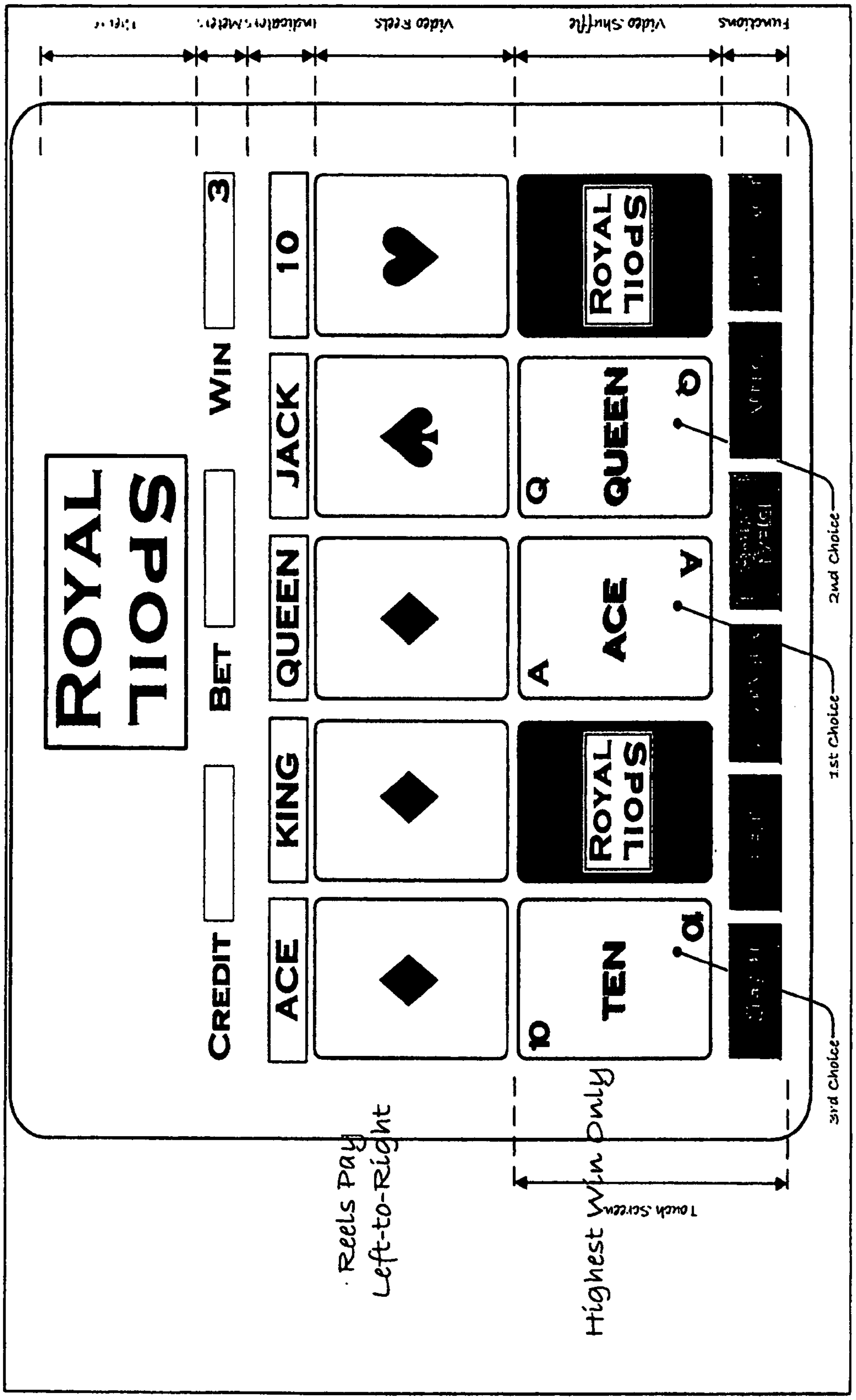
FIG. 7A shows a screen shot of the basic Roil Spoil™ game.
Figure 7B:
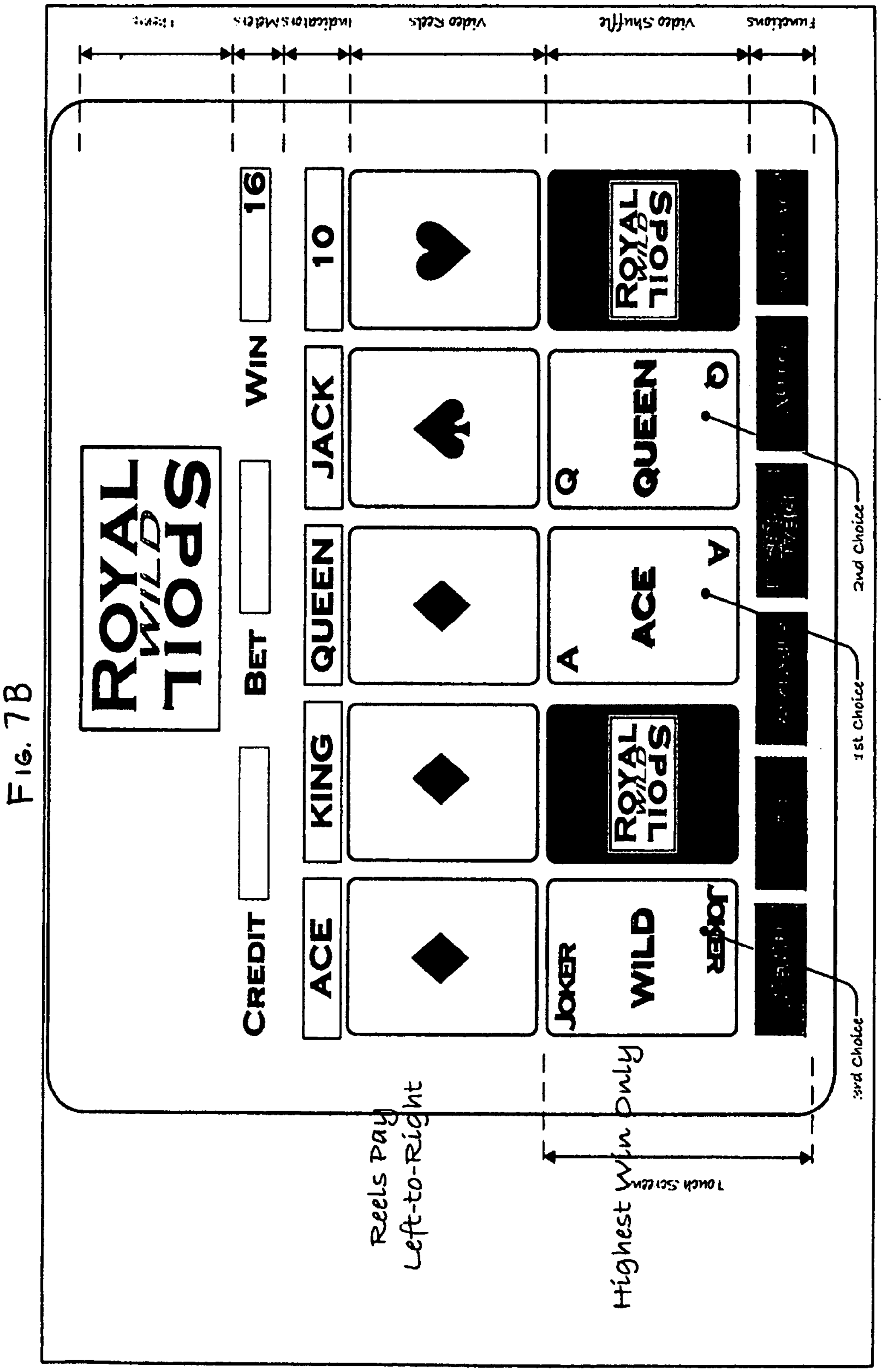
FIG. 7B shows a screen shot of the Royal Wild Spoil™ game.
Figure 7C:
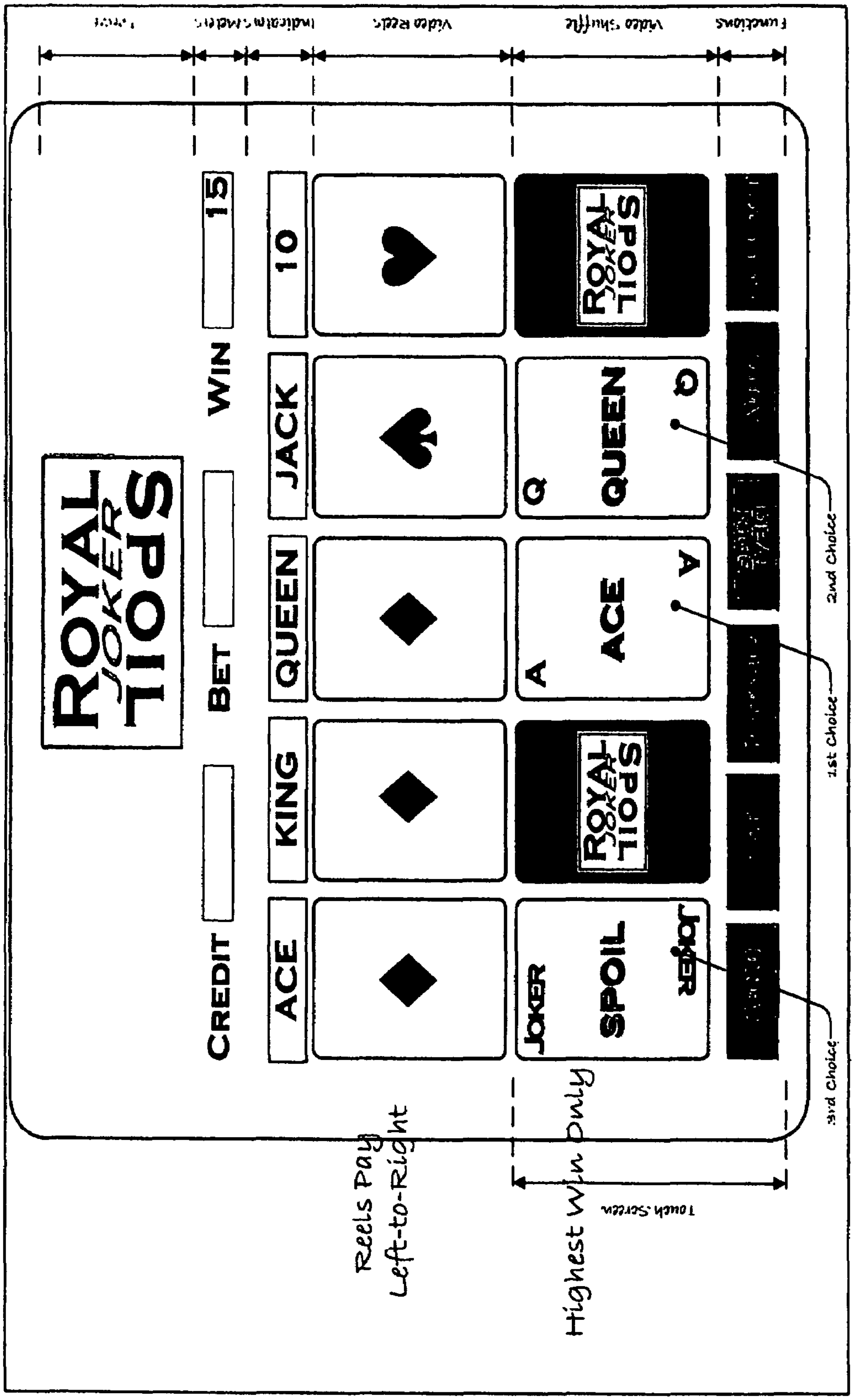
FIG. 7C shows a screen shot of the Royal Joker Spoil™ game.

FIG. 7A shows a screen shot of the basic Roil Spoil™ game. FIG. 7B shows a screen shot of the Royal Wild Spoil™ game. FIG. 7C shows a screen shot of the Royal Joker Spoil™ game. These screen shots show variations on the play of the games within the generic scope of the invention. Note that with the same generic suiting (diamond, diamond, diamond spade and heart) that there is a range of payouts available and even differences in payouts with the Royal Wild Spoil™ game and the Royal Joker Spoil™ games even with the same cards (with the joker SPOIL replacing the joker Wild).

The format of the present game is also amenable to bonus play. Bonuses may be awarded for any special predetermined reel event, such as a Royal Flush, Five-of-a-Kind, Five-of-a-Kind with a predetermined number of the cards (e.g., at least 3, 4 or 5 cards) in the same suit, and the like. Bonuses can be awarded with separate paytables on the same reel displays or additional display symbols added, or awarded free spins (at a predetermined effective credit input, such as at the amount of the last wager or at the highest amount allowed to be wagers, automatically). For example, specially suited cards ranks (such as a "suit" symbol comprising the Casino's name) may be added to the four suits or replace one or more of the suits and there would be special payouts for having a Special Flush or ranked hands with significant numbers of the Special Suit, and other bonus payouts for ranked hands without the Special Suit being significant. The bonus may be a fixed bonus or a progressive jackpot in which the amount increases with portions of all wagers or maximum wagers being added from centrally connected devices.

Although specific examples have been provided for the description of the system of the present invention, it is clear to those skilled in the art that alternatives and equivalents to the specific examples may be practiced and yet remain within the scope and intent of the disclosure of the present invention. By way of non-limiting examples, unique hardware and software may be used, and PC-based hardware and software may be used, as well as MAC and Linux and UNIX hardware and software. Mechanical reels as well as video displays may be used. Special sound and video effects may be incorporated into the display of the game. Cash and currency play may be used, credit play, and ticket-in/ticket-out technology may be used to fund the game. The systems may contain player-identification and player tracking technology, as well as security technology that is external and internal to the system, from video monitoring of players, to encryption/authentication programs operating on data transmission in the system. Reel mapping may be physical, statistical, templated, or otherwise provided so that appropriate returns and holds are achieved.

What is claimed:

1. A method of playing a wagering game comprising:

a player placing a wager in a wagering machine having a processor;

the wagering machine displaying at least a single payline of multiple symbols, the multiple symbols having a predetermined indication of order;

the processor independently selecting one of a plurality of generic characteristics for each of the multiple symbols and independently selecting one of a plurality of separate subgeneric characteristics for each of the multiple symbols;

the processor determining from the displayed generic characteristics of the multiple symbols alone on the payline whether the symbols have at least one of at least two available predetermined orders of the selected generic characteristics that are associated with a first award; and providing the player with an additional award when the determined at least one of the at least two available predetermined orders of generic characteristics includes a predetermined order of the selected separate subgeneric characteristics.

2. The method of claim 1 wherein the generic characteristics determined for the multiple symbols comprise playing card suit symbols also have rank symbol modifiers that distinguish like generic characteristics determined for the multiple symbols into subsets, and at least one event consisting of fewer than all of the multiple symbols on a single payline having a same generic characteristic as well as all of the multiple symbols on the single payline having the same generic characteristic symbol will assure the first award on the wager.

3. The method of claim 1 wherein increased awards above the first award are provided when the subgeneric characteristics of playing card ranks appear in a predetermined order of ranks.

4. The method of claim 2 wherein increased awards above the first award are provided when the subgeneric characteristics of playing card ranks appear in a predetermined order of ranks.

5. The method of claim 3 wherein awards vary in amount with respect to at least one predetermined order of subgeneric characteristics with one generic characteristic present in a set of symbols as compared to a same at least one other predetermined order of subgeneric characteristics with a second and different generic characteristic present in the set of symbols.

6. The method of claim 4 wherein awards vary in amount with respect to at least one predetermined order of subgeneric characteristics with one generic characteristic present in a set of symbols as compared to a same at least one other predetermined order of subgeneric characteristics with a second and different generic characteristic present in the set of symbols.

7. The method of claim 3 wherein the at least two predetermined orders of characteristics comprise orders other then Royal Flushes with card symbols in ascending or descending order.

8. The method of claim 4 wherein the at least two predetermined orders of characteristics comprise orders other then Royal Flushes with card symbols in ascending or descending order.

9. The method of claim 5 wherein the at least two predetermined orders of characteristics comprise orders other then Royal Flushes with card symbols in ascending or descending order.

10. The method of claim 6 wherein the at least two predetermined orders of characteristics comprise orders other then Royal Flushes with card symbols in ascending or descending order.

11. The method of claim 5 wherein each frame in the at least one payline having a number of frames has a number of subgeneric characteristics available, exclusive of blank spaces, that is equal to the number of frames in the payline.

12. The method of claim 5 wherein each frame in the at least one payline having a number of frames has a number of subgeneric characteristics available, exclusive of blank spaces, that is equal to the number of frames in the payline, and the number of frames on a payline is five, and the sudgeneric characteristics available consist of Aces, Kings, Queens, Jacks and Tens.

13. The method of claim 5 wherein at least two predetermined orders in a five frame payline that are payouts are selected from the group consisting of:

A-K-Q;
A-K-Q-J;
Q-K-A;
J-Q-K-A;
A-K; and
K-A.

14. A gaming apparatus for playing a computer based wagering game comprising:

a housing;
a processor;
a symbol display area; and
user interface capacity;

wherein the processor is programmed to randomly provide symbols on at least one payline, the processor executing a program to perform a method comprising:

a player placing a wager in a wagering machine having a processor;

the wagering machine displaying at least a single payline of multiple symbols, the multiple symbols having a predetermined indication of order;

the processor independently selecting one of a plurality of generic characteristics for each of the multiple symbols and independently selecting one of a plurality of separate subgeneric characteristics for each of the multiple symbols;

the processor determining from the displayed generic characteristics of the multiple symbols alone on the payline whether the symbols have at least one of at least two available predetermined orders of the selected generic characteristics that are associated with an award;

providing the player with an additional award when the determined at least one of the at least two available predetermined orders of generic characteristics includes a predetermined order of the selected separate subgeneric characteristics; and wherein the generic characteristics determined for the multiple symbols comprise playing card suit symbols also have rank symbol modifiers that distinguish like generic characteristics determined for the multiple symbols into subsets, and at least one event consisting of fewer than all of the multiple symbols on a single payline having a same generic characteristic as well as all of the multiple symbols on the single payline having the same generic characteristic symbol will assure a first award on the wager.

15. The apparatus of claim 14 wherein the generic characteristics shown on the multiple symbols also have subgeneric characteristic symbol modifiers that distinguish symbols having a same generic characteristic into subsets and programming requires that the at least two different predetermined orders of subgeneric characteristics also have same generic characteristic symbol modifiers.

* * * * *